Sept. 16, 1969 O. J. COLLINS 3,466,787
DYNAMIC DEPRESSOR FOR FISHING LINE
Filed July 3, 1967
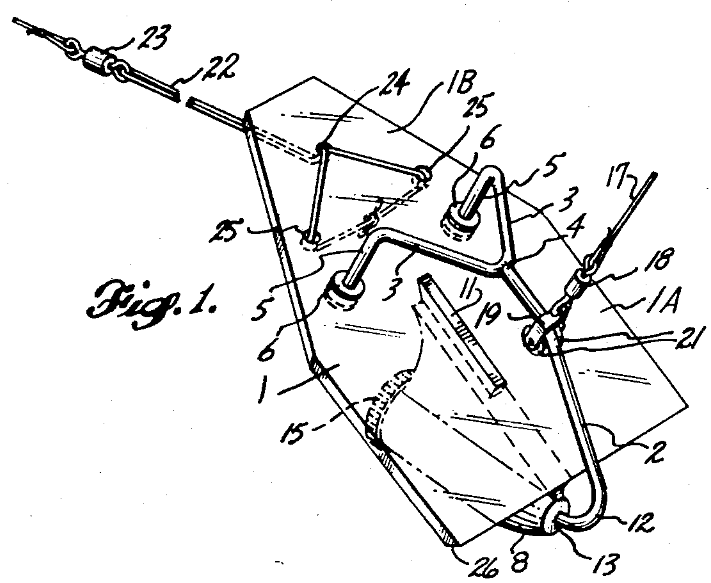
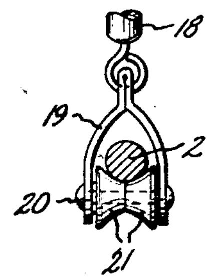
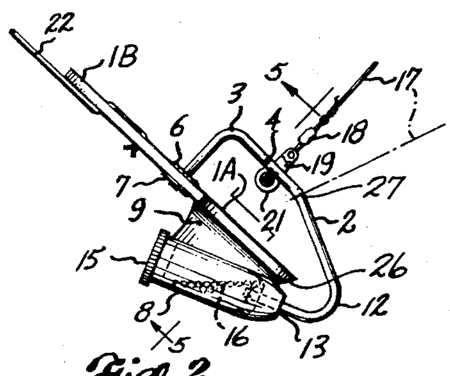
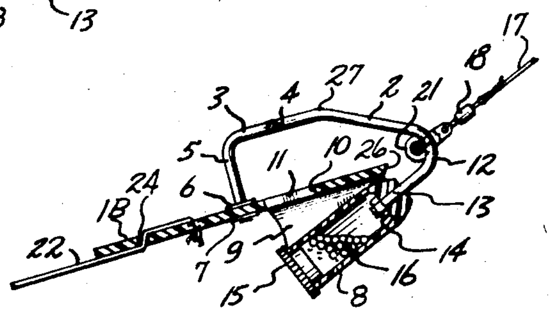
Fig. 3.
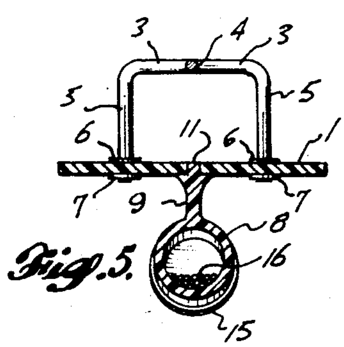
INVENTOR.
OREN J. COLLINS
BY
Robert W. Beach
ATTORNEY United States Patent Office 3,466,787

Patented Sept. 16, 1969

3,466,787

DYNAMIC DEPRESSOR FOR FISHING LINE

Oren J. Collins, 1313 27th St., Anacortes, Wash. 98221

Filed July 3, 1967, Ser. No. 650,752
Int. Cl. A01k 91/04, 95/00
U.S. Cl. 43—43.13 7 Claims

ABSTRACT OF THE DISCLOSURE

A fishing line can be slidably attached to the stem of a Y-shaped rod, the bifurcations of which have legs secured to the central portion, fore and aft, of a plate. The rear portion of the plate tapers rearwardly from its central portion and such rear portion is apertured to receive and anchor a fish hook leader. The stem of the Y-shaped rod curves downwardly around the leading edge of the plate and is attached to the forward portion of a container secured beneath the plate in a position with its axis inclined rearwardly and downwardly relative to the plate. Ballast in the container, such as lead shot, is shiftable forward when the plate is tilted downward and aft when the plate is tilted upward to vary the location of the center of gravity of the depressor.

A principal object of the dynamic depressor is to provide a depressor for fishing lines which is light in weight as compared to sinkers for comparable effectiveness in depressing a fishing line and which is stable in operation.

A more specific object is to provide such a depressor for fishing lines in which the center of gravity will shift automatically to tend to maintain the depressor either in a diving attitude or in an ascending attitude.

Another object is to provide such a dynamic depressor in which its weight and, particularly, its attitude-controlling weight can be increased or decreased readily as may be preferred.

It is also an object to provide such a dynamic depressor which is very effective in operation, is easy to attach to and remove from a fishing line, and which is simple in construction and economical to manufacture.

FIGURE 1 is a top perspective of the depressor in diving attitude and FIGURE 2 is a side elevation of the depressor in the same attitude.

FIGURE 3 is a bottom perspective of the dynamic depressor in ascending attitude and FIGURE 4 is a longitudinal vertical section through the depressor in the same attitude.

FIGURE 5 is a transverse section through the depressor taken on line 5—5 of FIGURE 2.

FIGURE 6 is a detail front elevation of a fishing line attaching device for the depressor with the remainder of the depressor broken away.

Various fishing line depressors have been proposed heretofore, but they have not been as versatile or as stable in operation as the depressor of the present invention. The plate 1 constitutes a water-reaction surface which will either depress a fishing line or raise it by the action of the water on the plate as it is drawn through the water depending upon the attitude of the plate as it is drawn through the water. When the plate is in the downwardly an forwardly inclined position shown in FIGURES 1 and 2, the reaction of the water on the plate will cause the plate to be drawn downward steeply so as to depress the end of the fishing line 17 to the desired fishing level depending upon the length of the line paid out. When the plate is tipped into an upwardly and forwardly inclined position, however, as shown in FIGURES 3 and 4, the dynamic action of the water on the plate, as it is drawn through the water, will cause the plate to ascend and raise the lower end of the fishing line.

A Y-shaped line-attaching rod mounted at the upper side of the plate 1 includes a stem 2 extending forwardly from the junction of bifurcations 3. Such stem and bifurcations can be secured together by a weld at their junction 4. The bifurcations are connected to the plate about midway fore and aft by legs 5 which extend through holes in the plate at opposite sides of its longitudinal center line. Because the portion of the plate 1B rearward of the legs tapers rearwardly, its area is less than the portion 1A of the plate forward of the legs. The legs 5 can be secured to the plate by spaced cupped washers pressed onto them. Upper washers 6 engage the upper side of the plate 1 and lower washers 7 engage the underside of the plate so that the washers pinch the plate between them and hold the legs 5 immovably to the plate.

A container 8, elongated in a fore and aft direction, is suspended beneath the bottom of the plate by a web 9. Through a slot 10, elongated fore and aft, extends a tongue 11 integral with the web 9. The upper portion of this web may be flared to provide a relatively wide bearing surface on the bottom of the plate, including shoulders extending along opposite sides of the tongue 11. The sides of such tongue, such shoulders and the flared upper edge of the web 9 can be bonded to the forward plate portion 1A by suitable adhesive to secure the web 9 rigidly to the plate.

The stem 2 of the Y-shaped rod is bent around the leading edge of the plate 1, as shown best in FIGURES 1 and 4, to dispose the end of such stem beneath the plate. The curve 12 in such rod is spaced a substantial distance ahead of the leading edge of the plate 1. The lower end 13 of the stem extends through an aperture in the forward portion of the container 8 and is secured in such aperture by a nut 14 received in the container. The open rear end of the container can be closed by a cap 15 which can be secured to the container either by a snap fit or by being threaded to the container so as to retain loose shiftable ballast 16 in the container.

The trailing end of the fishing line 17 can be attached by a connecting swivel 18 to a yoke 19. An axle 20 extends between and is supported by the ends of such yoke. On such axle are mounted generally conical rollers 21, as shown best in FIGURE 6, having their smaller ends in adjacent relationship. The yoke and rollers are assembled with the line-attaching rod 2, as shown in FIGURES 1 to 4 and 6, so that the rod is located between the rollers and the yoke, as shown best in FIGURE 6, and, therefore, cannot escape from the yoke connection.

It will be understood that with the stem 2 of the Y-shaped rod, thus extending through the yoke 19, such yoke cannot move rearwardly beyond the junction 4 of the stem 2 with the bifurcations 3 so that the line 17 always is attached to the forward portion of the depressor. The yoke can, however, shift position from the junction of such bifurcations forward to the bend 12 in the stem 3. A line 22 connects the fish hook leader through a swivel 23 to the rear portion of the depressor. Such connecting line may extend upward through a central hole 24 in the rear portion of the plate 1 and from that hole its parts can extend divergently forwardly to two holes 25, respectively, at opposite sides of the center line of the plate. The connecting line parts can extend down through such holes and be connected together beneath the plate, as shown best in FIGURES 1 and 3, to secure the connecting line to the rear portion of the plate.

The fishing line depressor of this construction is very versatile. For best operation, it is preferred that the ballast 16 be of loose shiftable type, although this is not necessary. As shown in the drawings, such ballast is lead shot in an amount insufficient to fill the interior of the container. When the plate 1 is inclined forwardly and downwardly, as shown in FIGURES 1 and 2, therefore, the ballast will be in the forward portion of the container 8, as shown in FIGURE 2, so as to tend to maintain the plate in this position by the center of gravity of the depressor, as a whole, being in a forward location.

When a fish strikes the leader, the resulting jerk on connecting line 22 will swing the plate 1 about the axle 20 from the downwardly and forwardly inclined diving position of FIGURES 1 and 2 into an upwardly and forwardly inclined position, such as shown in FIGURES 3 and 4. Such jerk also will draw the line depressor rearwardly so that the stem 2 of the line-attaching rod will run through the yoke 19 until the rollers 21 lodge in the bend 12 of the line-attaching rod as shown in FIGURES 3 and 4.

Because of the resistance of the water to movement of the line depressor through it and the continued pull of the fish on the connecting line 22, the depressor will tend to maintain its rearward position of FIGURES 3 and 4 relative to the fishing line 17. Also, because of the upwardly and forwardly inclined attitude of the plate 1 and the downwardly and rearwardly inclined relationship of the length of the container 8 relative to the plate 1, the shiftable ballast shot 16 will shift rearwardly to the rearward portion of the container, as shown in FIGURES 3 and 4. Such ballast shift will move the location of the center of gravity of the line depressor rearwardly to decrease the tendency of the leading end of the plate 1 to be depressed.

Thus, forward shifting of the line connection to the rod stem 2 from the position of FIGURES 1 and 2 to the position of FIGURES 3 and 4, accompanied by rearward shifting of the ballast 16 in the container 8, will tend to maintain the plate 1 in an upwardly and forwardly inclined ascending attitude, as shown in FIGURES 3 and 4. In addition, the leading end of the plate 1 may be provided with an underbevel 26 which will assist in maintaining the plate 1 in an ascending attitude as the plate is moved through the water. Consequently, instead of the depressor exerting a submerging force on the lower end of the line 17, it actually will produce a positive raising force on such line end to assist in surfacing the fish.

While the ballast has been referred to as being of loose shiftable type, the user can vary the type, as well as the size, of the weight placed in the container 8 in accordance with his personal preference. Thus, the weight could be a slug of lead which would fit within and completely fill the container. Alternatively, the lead slug could be shorter than the container cavity and could be held in a forward position, or in a rearward position, or in any intermediate position in the cavity by placing a spacer forward of the lead slug, or rearward of the lead slug, or spacers both forward and rearward of the lead slug. Such spacers could simply be wood blocks or could be blocks of light material, such as Styrofoam. Alternatively, the lead slug itself could be molded with a bulb at one end and a stem at the other of a composite length equal to the length of the container cavity and such slug could be located in the cavity with the bulb either in a forward position or in a rearward position.

While lead shot is an effective and economical type of shiftable ballast, mercury could be used to provide a more readily shiftable ballast. In either case, the amount of mercury or of lead shot could be varied, as desired, to meet the preference of the individual user. Also, if lead shot is used, the extent of shifting lengthwise of the container can be controlled by placing a plug, such as of wood or Styrofoam plastic, ahead of the lead shot or behind the lead shot, as may be desired. Such plug could be of a size to fill the portion of the cavity not filled by the lead shot so that such shot could not shift at all as the plate 1 is tilted, or the plug could be made as much smaller, as desired, to enable the shot to shift lengthwise of the container to a greater or lesser degree.

The material of which the various other parts of the depressor are made can be of different types according to the preference of the manufacturer. It is preferred, however, for the plate 1 to be made of transparent plastic material. The line-attaching rod 2, 3, 5 preferably is of brass and the washers 6 and 7 can be made of stainless steel. The container 8 and its supporting web 9 and tongue 11 can be made of plastic material similar to that of which the plate 1 is made. The cap 15 closing the open end of the container may be of metal, but is preferably of plastic, in order to give maximum effect to the ballast 16, instead of constituting a fixed weight of appreciable mass. The substantially frustoconical rollers 21 are preferably of molded plastic material. Consequently, they cannot corrode and because of the rolling contact they will not wear appreciably. The axle 20 and yoke 19 are preferably of stainless steel.

As has been mentioned above, the area of plate portion 1A forward of the legs 5 is greater than the area of the rearwardly tapered plate portion 1B rearwardly of the legs 5. The degree of difference in area of the plate parts 1A and 1B has a direct bearing on the depth to which the depressor will descend. When the line-attaching rollers 21 are engaged with the junction 4 between the rod 2 and the bifurcations 3, the depressor will descend until the frontal surface area of the line is equal to the difference between the area of plate parts 1A and 1B, which will be its maximum depth. Consequently, the size of the plate and the difference in area between its forward and rearward parts in relation to the size and length of line will determine the maximum depth to which the depressor will dive.

If the depressor should strike bottom or a solid object while it is being towed in the downwardly inclined position of FIGURE 2, the impact will cause the front end of the depressor to be elevated so that the rollers 21 will roll along the rod 2 to its forward bend 12 and therefore the plate 1 will be tilted from its position of FIGURE 2 to its position of FIGURE 4 immediately to ascend and free the depressor from the bottom or other object which it has struck. To reset the position of the rollers 21 from the curved forward portion 12 of the rod rearward so that the plate will be tilted from its ascending attitude of FIGURE 4 to its descending attitude of FIGURE 2, it is merely necessary to pay out line 17 until it is slack. The weight 16 will tilt the forward portion of the depressor downward.

For fast trolling at a rather shallow depth, the rollers 21 can be engaged with the rod 2 at the slightly bent location 27, as indicated in broken lines in FIGURE 2, in which case the plate will be inclined downwardly and forwardly less steeply than illustrated in FIGURE 2.

I claim:

1. A dynamic depressor for a fishing line comprising a plate, fishing line attaching means connected to said plate and disposed above the forward portion thereof for attaching a fishing line to the depressor, means for connecting a hook leader to the rear portion of said plate, a container suspended beneath the forward portion of said plate and having a cavity elongated fore and aft of said plate, and ballast means in said container cavity including loose material of a volume much less than the volume of said container cavity and which is shifted fore and aft by pitching of said plate and container to alter automatically the fore-and-aft location of the center of gravity of the depressor.

2. The dynamic depressor defined in claim 1, in which the elongated container cavity is inclined rearwardly and downwardly relative to the plate.

3. A dynamic depressor for a fishing line comprising a plate, fishing line attaching means connected to said plate and disposed above the forward portion thereof for attaching a fishing line to the depressor, means for connecting a hook leader to the rear portion of said plate, a container beneath the forward portion of said plate, a web projecting from the exterior of said container, elongated fore and aft of said plate and extending to and secured to said plate, and ballast means in said container.

4. The dynamic depressor defined in claim 3, in which the plate has a slot in it elongated fore and aft of the plate and the web has a tongue elongated fore and aft of the plate and extending upward into such slot.

5. The dynamic depressor defined in claim 1, in which the fishing line attaching means includes a rod having a portion bent around the front end of the plate and spaced therefrom, the upper end portion of said rod being connected to the upper portion of the plate and the lower end of said rod being connected to the forward portion of the container.

6. A dynamic depressor for a fishing line comprising a plate, means for connecting a hook leader to the rear portion of said plate, ballast means suspended beneath the forward portion of said plate, and fishing line attaching means connected to said plate and including a rod disposed above the forward portion of said plate and having its length extending fore and aft, a yoke embracing said rod and connected to a fishing line, and roller means beneath said rod carried by said yoke and engageable with the lower side of said rod.

7. The dynamic depressor defined in claim 6, in which the roller means include two frustoconical rollers tapered toward each other.

References Cited

UNITED STATES PATENTS

| | | | |
|---|---|---|---|
| 2,220,302 | 11/1940 | Thorne | 43—43.13 |
| 2,247,583 | 7/1941 | Louthan | 43—43.13 |
| 3,091,049 | 5/1963 | Reimers | 43—42.5 X |
| 3,135,065 | 6/1964 | Cromoga | 43—43.13 |
| 3,353,292 | 11/1967 | Luketa | 43—43.13 X |

WARNER H. CAMP, Primary Examiner

U.S. Cl. X.R.

43—42.22, 42.31, 42.49, 43.14